UNITED STATES PATENT OFFICE.

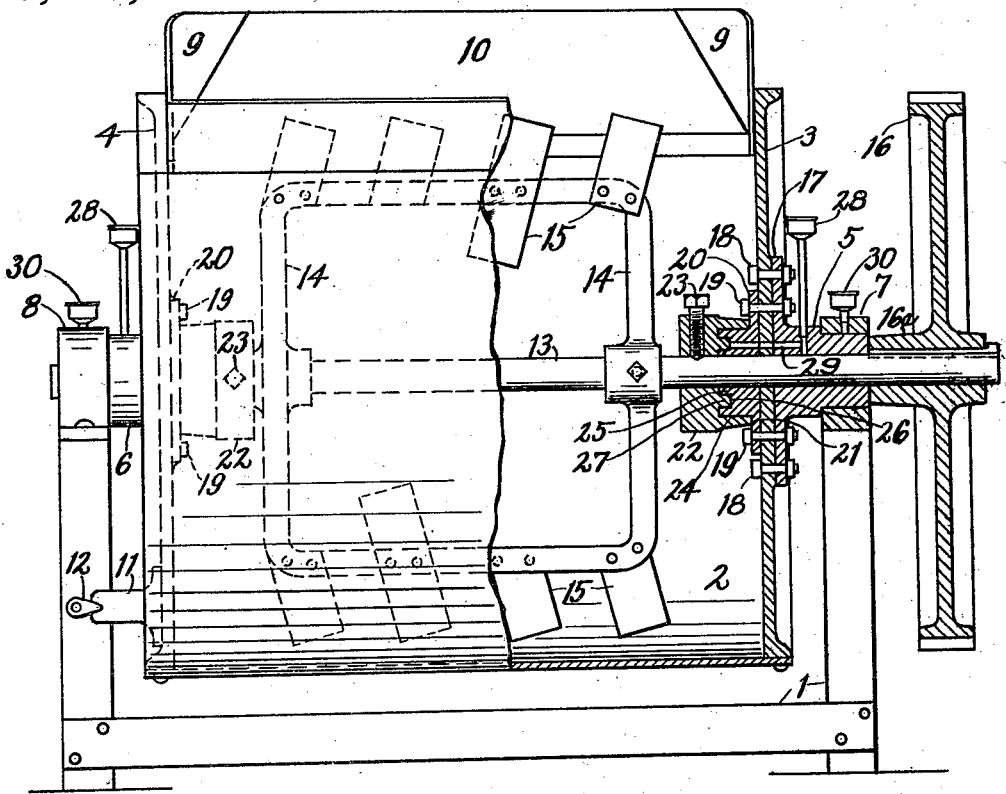
C. L. BROWN.
JOURNAL BOX FOR MIXING MACHINES.
APPLICATION FILED NOV. 13, 1920. RENEWED DEC. 10, 1921.
1,407,186. Patented Feb. 21, 1922.
INVENTOR:
Chauncey L. Brown
BY HIS ATTORNEY
A. M. Carlsen.

CHAUNCEY L. BROWN, OF NORTHFIELD, MINNESOTA, ASSIGNOR TO NORTHFIELD IRON COMPANY, OF NORTHFIELD, MINNESOTA.

JOURNAL BOX FOR MIXING MACHINES.

1,407,186.        Specification of Letters Patent.    Patented Feb. 21, 1922.

Application filed November 13, 1920, Serial No. 423,968. Renewed December 10, 1921. Serial No. 521,517.

*To all whom it may concern:*

Be it known that I, CHAUNCEY L. BROWN, citizen of the United States, residing at Northfield, in the county of Rice and State of Minnesota, have invented a new and useful Journal Box for Mixing Machines, of which the following is a specification.

My invention relates to machines for mixing concrete, mortar and any other materials which have a tendency to get into the journal bearings of the mixer shaft and cause undue wear and tear of the same.

The accompanying drawing is a partly sectional side elevation of a mixing machine embodying my improvement. In said drawing the machine is shown as standing with its mixer shaft in horizontal position, but it is obvious that the invention is applicable also to mixers placed with the shaft in vertical position or in a more or less inclined position as is customary in various types of mixing machines.

Referring to the drawing by reference numerals, 1 designates the frame, 2 the mixing drum that is to hold the ingredients being mixed. It has its bottoms or heads 3, 4 provided with hubs 5, 6, journaled in bearings 7 and 8 fixed on the frame.

In the present drawing the drum is shown as having a flaring extension 9—10 serving as the inlet through which the materials to be mixed are shoveled or dumped into the drum and when the mixture is finished it is poured out through a spout-like portion 10 of the said extension, the drum being normally held still by having a lug 11 held against the frame 1 by a latch 12, or any other suitable locking means; said locking means is unlocked while the drum is turned with the spout 10 downward and emptied.

Journaled in the hubs 5 and 6 is the mixer shaft 13, upon which is fixed suitable spiders 14 carrying hoeing and mixing blades 15. The shaft 13 is rotated by a cog wheel 16 or any other suitable means secured on it.

The hubs of the bottoms 3, 4 being alike I need describe but one of them. Said hub may be cast integral with the head but is preferably composed of an outer member having a flange 17 secured by bolts 18, 19, and an inner member 20 secured by the bolts 19.

The inner member 20 has a smooth face 21 against which fits the smooth end of a collar 22 having a set screw 23 securing it on the shaft in the desired closeness to the face 21. The collar 22 is formed with a cylindrical cavity 24 into which a cylindrical portion 25 of the member 20 is snugly fitted, and said extension is provided with an annular recess 26 in which rotates a snugly fitted rim 27 of the collar 22. The double telescoping joint thus formed serves to prevent the contents of the drum from working into the journal bearing of the shaft. Said joint and bearing are lubricated from a grease cup 28 and grease ducts 29 leading therefrom. The outer ends or sleeves 5 and 6 of the hubs are lubricated from oil cups 30.

The inter-fitting position of the collar 22 and the inner hub member 20 is maintained by having the hub 16ª of the gear 16 contact with the end of sleeve 5; or if said hub is arranged some distance from the sleeve a special collar (not shown) may be secured by a set screw between the wheel hub and the sleeve 5. If two heads are used as in my drawing, the two collars 22 will mutually hold each other close to the internal ends or members 20 of the hubs of the drum.

The operation being already incidentally stated in the foregoing specification I will here only further state that the flow of the grease from the elevated cups 28 tends to resist entrance of the mixing materials into the journals, thus aiding the multiple telescoped joint in keeping the journal free from foreign matter which might work into it from the contents of the drum. The mixer may be used for mixing concrete, mortar, paints and any other materials, and its form may be modified in various manners without departing from the scope of the invention.

What I claim is:

1. In a container having a rotating shaft extending through a portion of it; said portion having a bearing about said shaft; said bearing having an outward extension provided with an oil duct and an oil-cup applied thereto, and a cylindrical inward extension with an annular recess in the face of its inward end, a collar snugly fitted on the shaft within the inclosure or container and having a hollow cylindrical extension telescoping snugly upon the extension having the recess and fitting against the base of the bearing; said hollow extension having an annular rim fitting snugly into the annular recess, and said oil duct extending through the bearing so as to lubricate all the parts thereof.

2. The structure specified in claim 1, and means for adjusting and holding said collar and bearing in telescoped position and close relation to each other.

In testimony whereof I affix my signature.
CHAUNCEY L. BROWN.